United States Patent
Berranger et al.

(10) Patent No.: US 7,940,911 B2
(45) Date of Patent: May 10, 2011

(54) METHOD AND APPARATUS FOR PROVIDING A SPECIALIZED RESOURCE FUNCTION IN A TELEPHONE NETWORK

(75) Inventors: Jean-Alexis Berranger, Meylan (FR); Mark Syrett, Lumbin (FR); Jean-Philippe Caradec, Meylan (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1498 days.

(21) Appl. No.: 11/119,397

(22) Filed: Apr. 28, 2005

(65) Prior Publication Data

US 2005/0251563 A1    Nov. 10, 2005

(30) Foreign Application Priority Data

Apr. 29, 2004    (EP) .................................. 04300246

(51) Int. Cl.
    *H04M 7/00*     (2006.01)
(52) U.S. Cl. ............................... 379/220.01; 379/221.11
(58) Field of Classification Search .... 379/88.01–88.25, 379/220.01–221.12; 370/351–430; 709/217–244
See application file for complete search history.

(56) References Cited

U.S. PATENT DOCUMENTS

| | | | |
|---|---|---|---|
| 5,915,001 A * | 6/1999 | Uppaluru | 379/88.22 |
| 6,430,276 B1 * | 8/2002 | Bouvier et al. | 379/121.01 |
| 7,149,287 B1 * | 12/2006 | Burger et al. | 379/88.17 |
| 7,533,174 B1 * | 5/2009 | Lynch et al. | 709/227 |
| 2001/0036176 A1 * | 11/2001 | Girard | 370/352 |
| 2003/0078987 A1 * | 4/2003 | Serebrennikov | 709/217 |
| 2003/0108184 A1 | 6/2003 | Brown et al. | |
| 2003/0233239 A1 | 12/2003 | Moore et al. | |
| 2004/0042444 A1 * | 3/2004 | Edmon et al. | 370/352 |
| 2004/0141595 A1 * | 7/2004 | Crockett et al. | 379/88.17 |

OTHER PUBLICATIONS

European Patent Office Search Report—dated May 11, 2004—European Patent Application No. 04300246.8-1237.

* cited by examiner

*Primary Examiner* — Fan Tsang
*Assistant Examiner* — Assad Mohammed

(57) ABSTRACT

To provide a specialized resource function within the telephone network, server apparatus is described having a first interface for communication with a signalling network of a telephone network and a second interface for communication with a media gateway that has at least one bearer channel to the telephone network. The apparatus has a control arrangement for enabling the apparatus to provide, through the second interface, a document, such as a VoiceXML document, for rendering by the media gateway, the document being provided at least partly under the control of information received from a service control subsystem of the telephone network in an interaction through the first interface. An associated media gateway and method are also described.

26 Claims, 3 Drawing Sheets

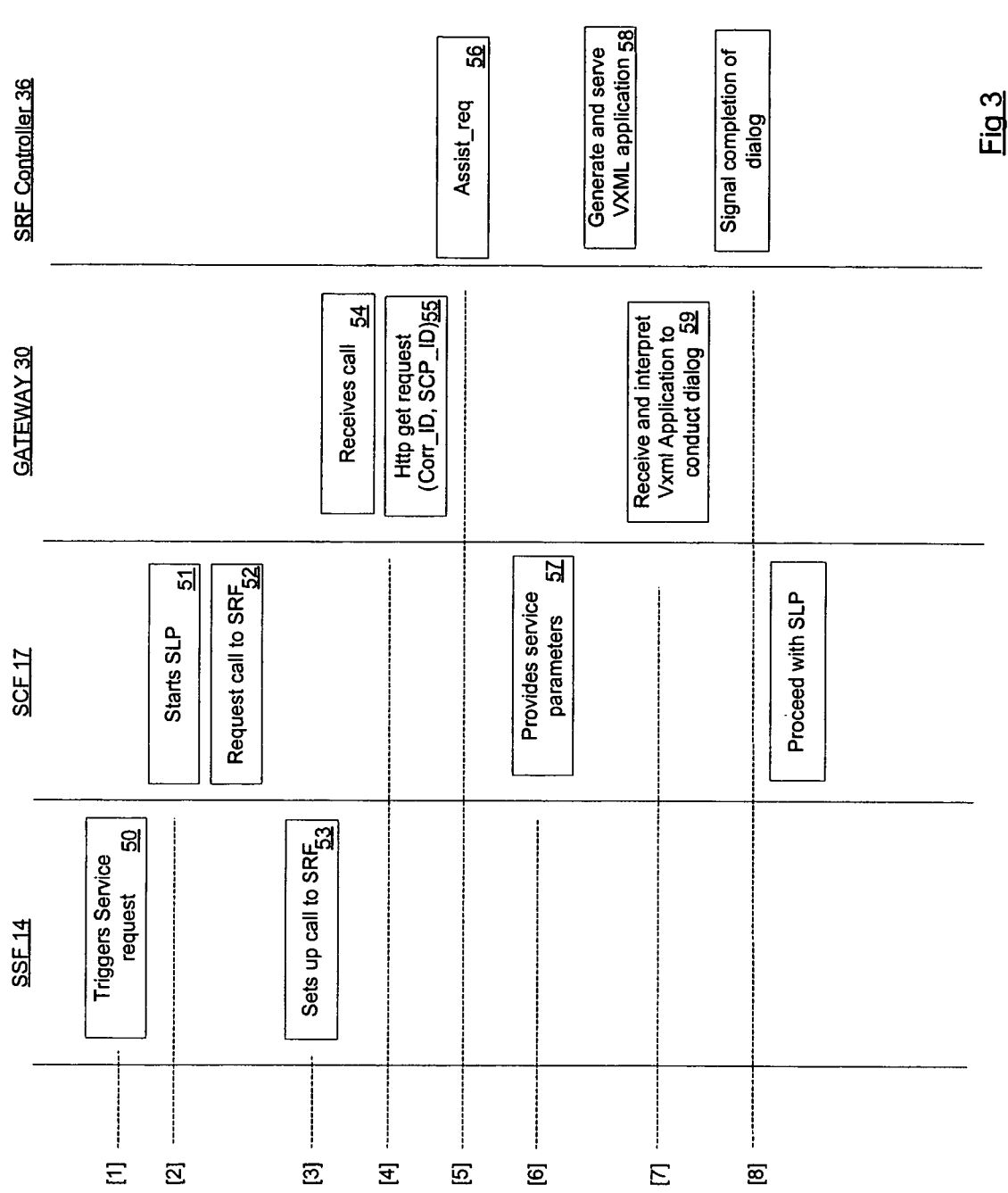

METHOD AND APPARATUS FOR PROVIDING A SPECIALIZED RESOURCE FUNCTION IN A TELEPHONE NETWORK

FIELD OF THE INVENTION

The present invention relates to telecommunications and, more particularly, to arrangements for providing a specialized resource function (SRF) for an Intelligent Network infrastructure.

BACKGROUND OF THE INVENTION

Telecommunication companies running PSTNs (Public Switched Telephone Networks) and PLMNs (Public Land Mobile Networks) are in the business of providing communication services and in doing so provide built-in intelligence in the form of "IN services" such as 800 number services and call forwarding, for instance.

The basic service provided by a PSTN (Public Switched Telephone Network) is the interconnection of two telephones (that is, setting up a bearer channel between the telephones) according to a called-party telephone number input at the calling-party telephone. FIG. 1 is a simplified representation of a PSTN providing such a service. In particular, customer premises equipment, CPE, 10 are connected through an access network 11 to switching points, SPs 12 (only one SP is shown in FIG. 1). The SPs 12 form nodes in an inter-exchange network 13 made up of interconnecting trunks 14 and SPs that are controlled by control entities 15 in the SPs. The control effected by the control entities 15 is determined by signalling inputs received from the CPEs and other SPs, and involves call setup, maintenance and clearance to provide the desired bearer channel between calling CPE and called CPE. Conceptually, the PSTN may be thought of as a bearer network and a control (signalling) network, the function of the latter being to effect call control through the bearer network, namely the control of setup, maintenance and take down of bearer channels through the bearer network; in practice, the bearer and signalling networks may use the same physical circuits and even the same logical channels.

Thus, where the CPE 10 is a traditional dumb telephone, control signalling between the CPE and its local SP is in-band signalling, that is, the signalling is carried on the same channel as used for voice; this signalling is interpreted and converted at the SPs 12 into signalling between SPs that uses a dedicated common-channel signalling network 16. Common-channel signalling network is generally implemented using the SS7 protocol suite. Modern SPs use the ISUP (ISDN User Part) SS7 protocol for inter-exchange call control signalling.

In addition to basic call handling, an SP may also serve to provide what are called IN (Intelligent Network) services; in this case the SP is termed a service switching point, SSP. An SSP provides a logical function referred to as a Service Switching Function (SSF) 25, that is it is arranged to suspend call processing at defined points-in-call upon particular criteria being met, and to delegate the continuation of call processing to a service control subsystem providing a service control function (SCF) 17 either in the form of a service control point, SCP, or an Adjunct. An Adjunct would be directly associated with an SSF 25 whilst an SCP and SSF 25 communicate with each other via an extended common channel signalling (CCS) network 16 that may include signal transfer points (STP) (not shown). The SCF 17 may be associated with more than one SSF 25. SCF 17 provides a service logic execution environment (SLEE) 20 in which instances of one or more service logic programs (SLP) 21 can execute. The SLEE 20 and SLP 21 together provide service control functionality for providing services to the SSF 25.

Service logic running in an SCP or Adjunct will generally make use of subscriber information stored in a service data function (SDF) 22 that may be integral with the SCP or partially or wholly separate. The service data function (SDF), like the service control function (SCF) forms part of the service control subsystem of the PSTN. It may be noted that some or all of the service control function may be built into the PSTN switches themselves.

In operation, when the SSF 25 receives a call, it examines internal trigger conditions and, possibly, user information (eg dialed digits) to ascertain if the call requires a service to be provided by the service control point 17; the checking of trigger conditions may be carried out at several different points in call processing. Where the SSF 25 determines that a service is required it messages the SCF 17 requesting the desired service and sending it a logic representation of the call in terms of its connectivity and call processing status. The service control subsystem then provides the requested service and this may involve either a single interaction between the SSF and service control subsystem or a session of interactions.

In addition to the SCF 17, the network illustrated in FIG. 1 may include an Intelligent Peripheral (IP) or Specialized Resource Function (SRF) 23. The term SRF, which refers to the logical as opposed to the physical entity, will be used in the following description to refer to this element. SRF 23 has bearer-channel connectivity to one or more SSFs 25. SRF 23 provides resources needed to exchange information with an end user, such as voice announcements and DTMF digit collection capabilities (this type of non-signalling information intended to be passed over a bearer-channel to/from the end user is referred to below generally as "content"). In known implementations, these resources are managed and controlled by a resource control execution environment (RCEE) of the SRF 23 in response to input received from an SSF 25. Such input may result, for example, from SCF 17, during execution of an SLP 21, requiring a voice announcement to be played to an end user; in this case the service control subsystem passes this requirement to the SSF concerned which sets up a bearer channel to the SRF 23 and commands the SRF to play the required announcement. It is also possible to arrange for the service control subsystem to communicate directly over the CCS network with an SRF rather than going though an SSF 25.

SRF functionality and resources may also be provided within a service node (SN) which like an IP has bearer-channel connectivity to an SSF; however, an SN additionally includes an execution environment, similar to SLEE 20, for running service logic programs. An SN can thus provide a range of services virtually autonomously once an SSF has switched through a call to the SN; in particular, an SN is apt to provide services such as voice mail, automated attendant and fax server, all of which require substantial transfer of content to/from an end user. To the extent that an SN can execute specific types of SLPs, it forms part of the service control subsystem of the network.

The above-described model for the provision of IN services in a PSTN can also be mapped onto PLMNs (Public Land Mobile Networks) such as GSM and other mobile networks. Control signalling in the case of a mobile subscriber is more complex because in addition to all the usual signalling requirements, there is also a need to establish where a call to a mobile subscriber should be routed. Thus in GSM for instance, the service data function (SDF) is largely located in a system named a Home Location Register (HLR) and the service control function in a-system named a Visitor Location Register (VLR) that is generally associated on a one-to-one basis with each SSF (which in GSM terminology is called a Mobile Switching Centre, MSC).

Because subscribers are mobile, the subscriber profile is transported from the HLR to whichever VLR happens to be functionally closest to be mobile subscriber, and from there the VLR operates the (fixed) service using the subscriber profile and interacts with the SSF. The HLR and VLR thus constitute a service control subsystem similar to an SCP or Adjunct with their associated databases.

The above-described general architectural framework has proved generally satisfactory and many voice services have been successfully deployed around the world using large, fault-tolerant computer systems which provide services for hundreds of thousands or even millions of subscribers.

In parallel with the implementation of IN telephone infrastructure, the Internet and the, more particularly, the World Wide Web (WWW) have grown rapidly to become the primary electronic information distribution service in terms of spread, availability and richness of information content and a ubiquitous vehicle for on-line commerce and services.

One important factor in the success of the WWW has been the use of markup languages, and particularly the HyperText Markup Language (HTML), for representing the makeup of documents transferred over the WWW, and the availability of powerful graphical Web browsers for interpreting such documents in a client terminal to present them to a user. Coupled with this technologies have been developed for dynamically generating the documents at the server side in conjunction with back-end business applications.

However, it is in many situations far more convenient to have access to a telephone than to have access to a computer with an Internet connection. As a result, there has been increasing interest in being able to access web-based or web-like services from telephones.

Voice Browsers, such as that provided by the HP Opencall Media Platform, allow access to web-based or web-like services from any telephone by using speech synthesis, pre-recorded audio, and speech recognition. A voice browser is interposed between a user and a voice page server and may access the voice page server using http over the Internet. A voice page server holds voice service pages (text pages) that are marked-up with tags of a voice-related markup language (or languages), such as the Voice eXtensible Markup Language (VoiceXML). When a VoiceXML page is requested by the user, it is interpreted by the voice browser and output intended for the user may, for example be passed in text form to a Text-To-Speech (TTS) converter which provides appropriate voice output to the user. User voice or DTMF input can also be decoded or recognised to text and passed back to the server. Of course, voice service pages can also be dynamically generated at the server-side.

The present invention is directed to facilitating the integration of modem voice-browser platforms, and other types of media gateways, in pre-existing IN-based networks.

SUMMARY OF THE INVENTION

In brief, to achieve this there is provided server apparatus having a first interface for communication with a signalling network of a telephone network and a second interface for communication with a media gateway that has at least one bearer channel to the telephone network. The apparatus has a control arrangement for enabling the apparatus to provide, through the second interface, a document for rendering by the media gateway, the document being provided at least partly under the control of information received from a service control subsystem of the telephone network in an interaction through the first interface. In this way, the combination of the server and the media gateway provide a specialized resource function within the telephone network.

This provides a transparent way to replace conventional closed-box Intelligent Peripherals with media gateways, such as VoiceXML gateways, that operate with the above-described server, without necessarily modifying the IN services or platforms and service logic providing the SCF. This allows telephone network operators to use the same VoiceXML gateway to process both IN-based user interactions and the voice portal or other calls for which the media gateway is primarily designed.

Thus, in at least preferred embodiments, the documents comprise control tags, such as VoiceXML tags for interpretation by the media gateway. Moreover, the SCF logic can be adapted to also benefit from the flexibility of the media gateway to provide enhanced services beyond those provided by pre-existing SCF implementations. For instance, through VoiceXML extensions, high-quality audio, picture and video can be added to the interaction depending on the capabilities of the end-user device.

The control arrangement can be arranged to initiate the interaction with a service control subsystem identified by an identifier received by the server apparatus from the media gateway and to provide to the service control subsystem a context identifier received from the media gateway to identify a session context held by the service control subsystem.

The second interface is preferably an http interface, although application of this architecture to comparable situations that may use other protocols is not excluded.

In another aspect, the invention provides a media gateway comprising a bearer interface to a telephone network; an interface to a data network, and an interpreter for rendering documents received from the data network. The gateway has a control arrangement for responding to an incoming call by extracting at least a service control subsystem identifier from call setup information received for the incoming call and issuing a request to the data network to obtain a document for rendering, passing at least the extracted service control subsystem identifier as a parameter in the request.

In a further aspect, a subsystem for providing a specialized resource function within a telephone network having a signalling network and at least one service control subsystem. The subsystem comprises at least one media gateway comprising a bearer interface to a telephone network; and server apparatus comprising a first interface for communication with the signalling network and a second interface for communication with the media gateway. The server apparatus comprises a control arrangement for enabling the apparatus to provide, through the second interface, a document for rendering by the media gateway, the document being provided at least partly under the control of information received from the service control subsystem in an interaction through the first interface. The media gateway comprises an interpreter for rendering documents received from the server apparatus, the media gateway having a control arrangement for responding to an incoming call by extracting at least a service control subsystem identifier from call setup information received for the incoming call and issuing a request to obtain a document from the server apparatus for rendering, passing at least the extracted service control subsystem identifier as a parameter in the request.

The subsystem can comprise a plurality of such media gateways.

In yet another aspect, a method is provided for operating server apparatus comprising: receiving a request from a media gateway; specifying documents to be provided in response to the request using at least some information received from a service control subsystem in an interaction through an interface to a signalling network of a telephone network; providing the specified documents for rendering by a media gateway in response to the request.

BRIEF DESCRIPTION OF THE DRAWINGS

Embodiments of the present invention will now be described, by way of non-limiting example, with reference to the accompanying diagrammatic drawings, in which:

FIG. 3 is a flow chart showing the principal method steps performed in one embodiment of the invention.

BEST MODE OF CARRYING OUT THE INVENTION

Figure 2:
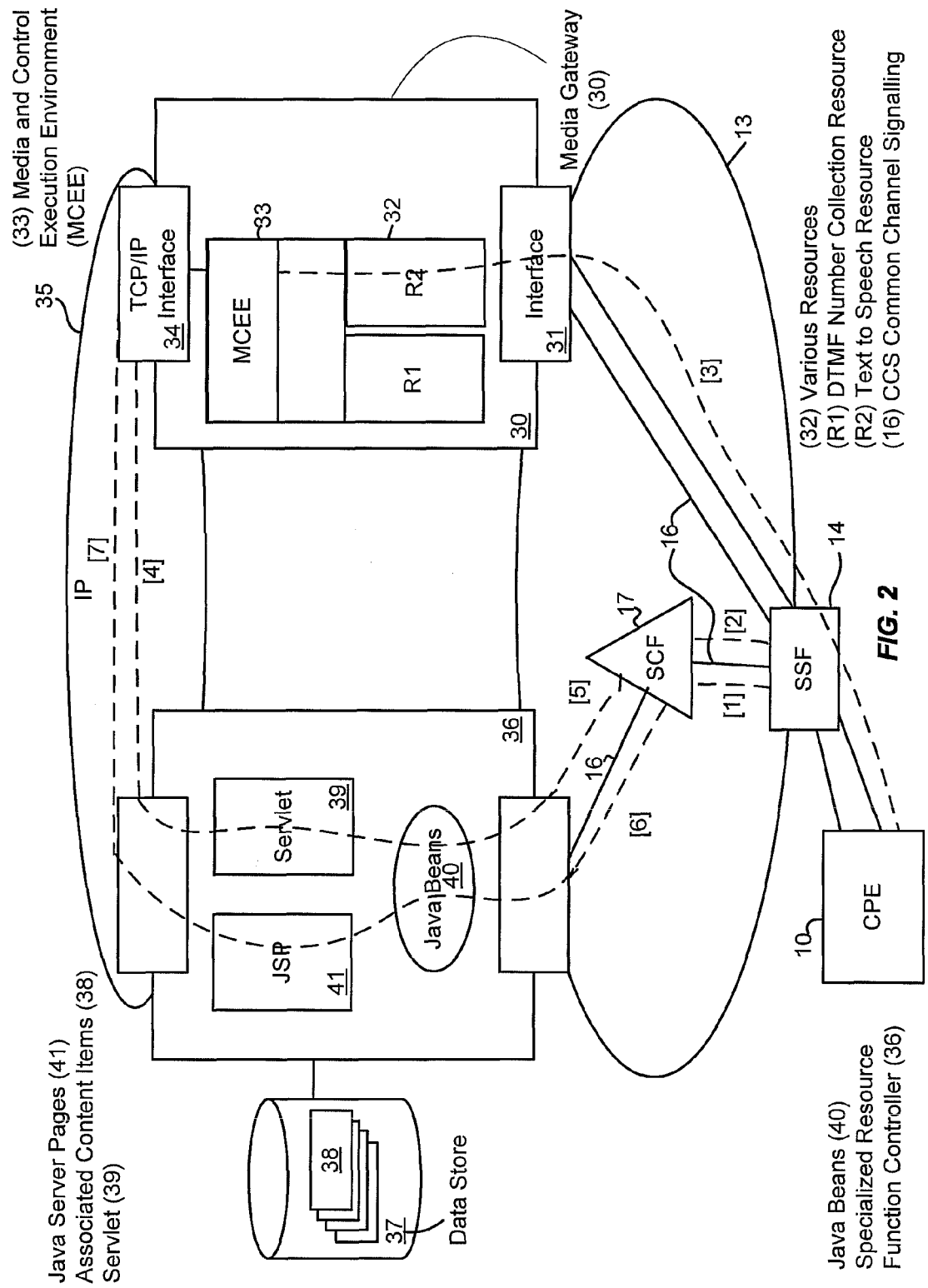
FIG. 2 is a schematic diagram illustrating an embodiment of the invention.

FIG. 2 shows an embodiment of the invention in which a VoiceXML interpreter within a media gateway is used in conjunction with a suitably designed application server to provide an SRF in a pre-existing service network. FIG. 2 shows a telecommunications system that includes a pre-existing portion 13 that includes one or more SSFs, such as SSF 14, and one or more SCFs such as SCF 17. The system also includes one or more media gateways 30 and one or more server entities 36 that will be referred to herein as SRF Controllers, that together act as an SRF. For reasons of clarity, neither the bearer network nor CCS network connections are explicitly shown in FIG. 2 except for those parts active in relation to the information service to be described hereinafter. Similarly only a single SCF, SSF, media gateway 30 and SRF Controller 36 will be referred to, but it will be understood that a real-world implementation may be dimensioned to include any desired number of each element. It will be appreciated that the FIG. 2 representation of a PSTN is in any case highly diagrammatic.

Figure 1:
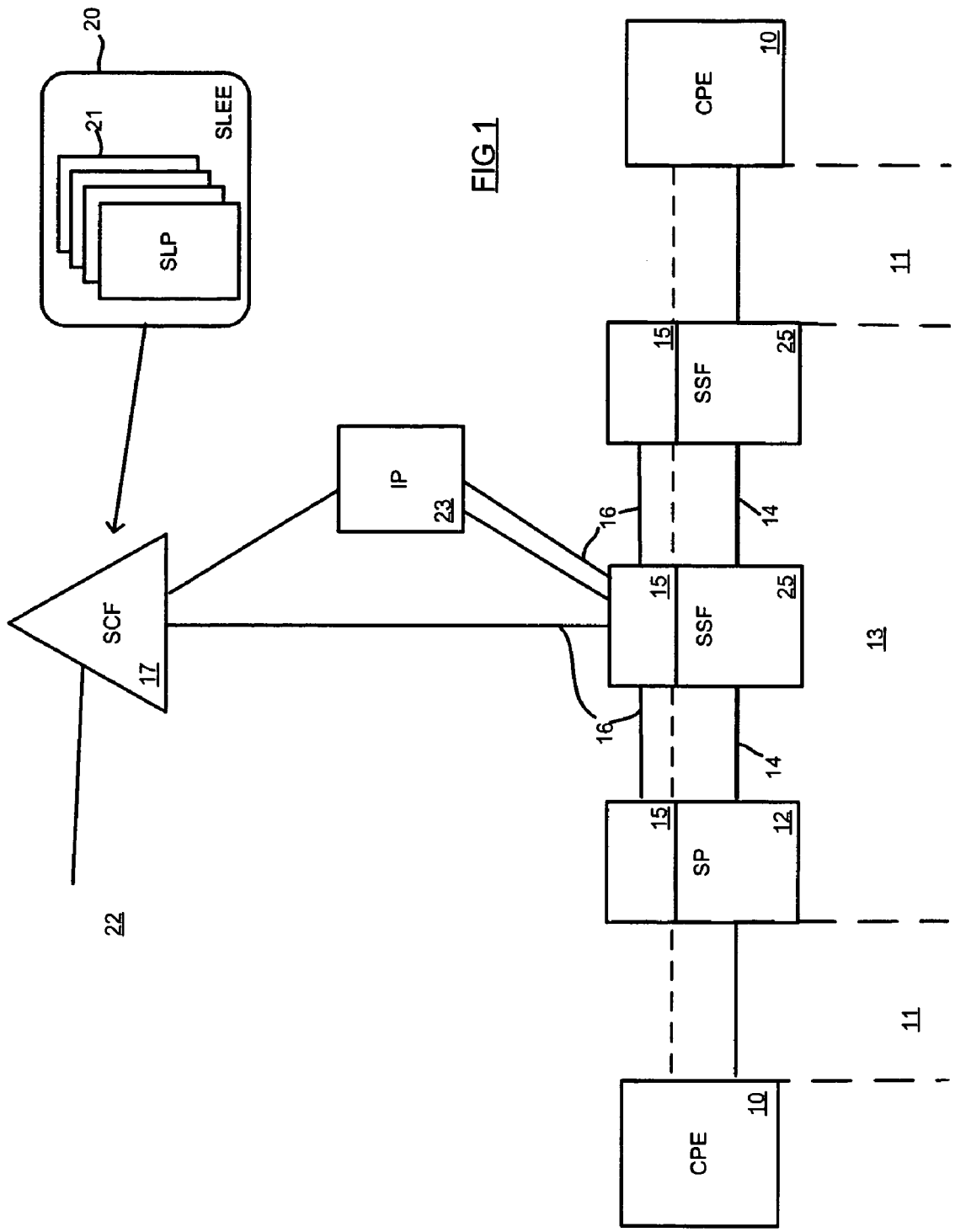
FIG. 1 is a simplified diagram of a standard PSTN with IN service capability.

SCF 17 operates in a conventional manner as a service control subsystem operative to respond to service requests from SSF 14 to run a specific SLP on particular data according to information contained in the service request, and to send back to the requesting SSF 17 appropriate instructions for effecting call set-up or other service provision. The SLP may be any pre-existing SLP that may be unmodified with respect to its operation in, for instance, the prior art arrangement of FIG. 1. A service request is generated by an SSF 14 in response to predetermined trigger conditions being met at a trigger check point, there being one or more such check points in the course of handling a call.

The term "media gateway" is generally used to refer to the function that provides the media mapping and/or transcoding functions between potentially dissimilar networks, one of which is presumed to be a packet, frame or cell network. In this embodiment, media gateway 30 comprises a bearer network interface 31 for providing bearer channel connectivity to the PSTN; various resources 32 such as a DTMF number collection resource (R1), and a Text to Speech resource (R2) for playing back recorded announcements from text input; and a media and control execution environment (MCEE) that includes a voice XML interpreter 33. The MCEE is arranged to control the resources 32 and interface 31. SCF 17 may make use of the resources provided by media gateway 30 to provide a particular service.

As will be described in more detail below, media gateway 30 acts in accordance with signalling messages received over the CCS network by SRF Controller 36 from an SCF 17 executing an SLP. The interface 31 includes switching functionality to permit the appropriate resource to be connected to the right bearer channel, it being appreciated that the gateway 30 would normally be designed to be able to provide resources concurrently to multiple bearer channels routed to it. Gateway 30 is also provided with an TCP/IP access interface 34 to an IP network 35 in order to make use of VoiceXML documents and associated content items 38 (illustrated by way of example as being provided in data store 37) during the course of processing at least some of the requests from an SCF 17. The VoiceXML documents and their associated content items 38 will be collectively referred to herein as VoiceXML applications.

Media gateway 30 may, for instance, be the HP OpenCall Media Platform product that includes a VoiceXML 2.0 interpreter.

IP network 35 may be the Internet or any other network or sub-network using similar technologies or providing similar services, including intranets or extranets or ad-hoc network assemblages. It will be appreciated that the term is intended to include not only the current specification of the relevant protocols used for the public Internet and the current addressing scheme, but also evolutions of these features. Furthermore, references to the WWW and the HTTP protocol should equally be understood to encompass their evolved descendants. Similarly, references to applicable standards with the telephone network are also intended to encompass their evolved descendents.

In this embodiment, the VoiceXML documents that are provided by SRF Controller 36 and interpreted by media gateway 30 may include or reference any type of information that can usefully be passed over the PSTN bearer network to an end user, possibly after a conversion of form at the gateway 30. For example, a VoiceXML document may include a text message and VoiceXML formatting tags and that after copying to media gateway 30 can be converted to speech by a text-to-voice converter resource of the gateway for delivery to a bearer channel. Another content item may be in the form of a digitised speech file which can be used directly by media gateway 30, without substantial conversion, for delivery to a bearer channel by media gateway 30 (assuming that such channel is digital).

In the embodiments to be described below, the JavaServer Pages (JSP) technology is employed as a means to dynamically generate VoiceXML documents within SRF Controller 36, although it will be appreciated that any other suitable dynamic Web scripting/programming arrangement may equally be used. The JSP technology uses XML-like tags to encapsulate the logic that generates the content for a web page. The application logic can reside in server-based resources (such as JavaBeans) that the page accesses via these tags.

The JavaServer Pages technology separates the web application into a presentation layer, a business and a data layer. This architecture is often referred to in web application server literature as the 3-tier model. Physically, the 3 tiers can be implemented separately and on different servers although in this example the parts are shown for clarity as being present within a single element represented as SRF controller 36. The components to be described below can be deployed on different servers in a network and communicate with each other for needed services. SRF Controller 36 thus includes a servlet 39, one or more JSP pages 41 that include VoiceXML tags and one or more Javabeans 40 that may be used for accessing the service control subsystem SCF 17. In this embodiment, access to any external data resources (the "data layer") required is assumed to be handled by the SCF 17. As is well known in this context, the term servlets refer to server-side modules that can be used to extend the capabilities of a Web server. The term Javabean refers to a program building block that can be combined with other components in the same or other computers in a distributed network to form an application.

Servlet 39 and serves to process an incoming HTTP request by instantiating the Javabeans used by the JSP 41, as well as deciding which of JSP pages 41 to forward the request to. In such system, there is not normally any processing logic within the JSP pages themselves; they are simply responsible for retrieving the javabeans that were instantiated by servlet 39, and extracting any dynamic content that may have been received from SCF 17 for insertion within static VoiceXML templates.

SRF Controller 36 has an interface to the CCS network 16 and is arranged to interact with it using the applicable standard protocols, such as INAP, IS-41 and CAMEL running over TCP. It is envisaged that SRF Controller 36 be located within the CCS network in relative proximity to SCF 17 in order to provide legacy support for its SLPs. However, other arrangements are not excluded including where SRF Controller is only indirectly connected to the CCS 16, via a SIGTRAN gateway for instance.

FIG. 3 illustrates an example of the operation of the above-described system where a PSTN user makes use of a service that employs a particular content item that might be a VoiceXML page that includes text to be converted to speech by gateway 30 in order to make an announcement to the caller, for instance.

Functioning of the information retrieval service for this content item proceeds as follows:

[1] Upon a user dialling an appropriate telephone number on telephone 10, the connected SSF detects a trigger for that particular call and triggers an appropriate service request to SCF 17. This is shown as step 50 in FIG. 3.

[2] SCF 17 runs an instance of the SLP (step 51) corresponding to the triggered service which decides to start an end-user interaction. The SLP sends a request being sent to SSF 14 for a voice channel to be set up to media gateway 30 (step 52). SCF 17 maintains a session context for the SLP instance and the session context is identified by a correlation ID as part of its normal operation. The correlation_ID as well as an SCF_ID are provided to SSF 14 and then to media gateway 30 as part of the conventional ISUP call set-up process.

[3] SSF 14 sets up the call to gateway 30—step 53.

[4] Gateway 30 receives the call (step 54) and issues an HTTP GET request message to SRF Controller 36 in order to obtain a VoiceXML document for conducting the required dialog with the user. As part of the ISUP call set-up information, gateway 30 receives the SCF_ID and correlation ID that identifies the SLP context within SCF 17 for the incoming call. From the SCF_ID, the correlation ID and the destination number, media gateway 30 can determine a URL from which a VoiceXML script may be retrieved using HTTP and provide enough information for SRF Controller to interact with SCF 17.

Many arrangements are possible for determining the correct URL from the incoming call parameters. For instance, the HTTP GET request may be directed to a generic URL and include the Correlation_ID and SCF_ID as parameters, for instance a URL of the form http://www.srf_controller/service.jsp?25.58 might be used where 25 is the SCF_ID and 58 the correlation_ID. Alternatively, a URL may be derived from the SCF_ID or a table, or other look-up scheme, may be arranged linking SCF_ID with a set of URLs. The use of a table or other look-up arrangement within the gateway, whilst possible, is less preferred because of the need for additional provisioning.

In present IN arrangements, the actual service or content sought is primarily identified by the destination number. Thus, the SCF_ID and Correlation_ID may be used to correlate the call with the SCP commands and the destination number used to identify the URL of the VoiceXML page.

[5] Servlet 39 within SRF Controller 36 receives the HTTP get request and instantiates a Javabean 41. Javabean 41 is arranged to issue an IN Assist_request to SCF 17 before a response to the http request is generated—step 56. Such Assist_requests would be expected by the pre-existing SLP instance that is being executed in SCF 17. The SCF_ID is used to select the appropriate SCP and the Correlation_ID is passed in the assist request to allow the SCP to associate the assist request it receives with an existing call context. It will be understood that the request names mentioned here relate to the INAP IN model, and that equivalent constructs may be used for implementations using other protocols, such as WIN, CAMEL or IS41.

[6] In the present embodiment, it is SCF 17 that has started a user interaction with the objective of conducting a certain dialog with the user to provide content such as an announcement and/or to collect information. The information needed to specify and/or control this dialog may be provided in response to the assist request. This information is then used by SRF Controller 36 to identify and retrieve relevant content items 49 and populate the appropriate JSP pages 41. The type of information provided by SCF 17 may vary widely. For instance, The SRF controller may receive from SCF 17 INAP CS1 requests like "playAnnouncement" or "PromptandCollect" that will be translated into VXML pages directly. In other arrangements, an INAP CS2 "RunScript" request might be received that can start a VoiceXML application that include multiple user interactions including error handling.

[7] In this example, the resulting JSP page will be assumed to be a VoiceXML application that is served to media gateway 30 in step 58 and in response to the HTTP get request and a VoiceXML session is thus started and continues as VoiceXML documents are loaded and unloaded. It will be understood that a VoiceXML application can be a set of VoiceXML documents that share the same application root document. The root document is automatically loaded into the Voice XML interpreter whenever one of the application documents is loaded, and remains loaded until there is a transition to a different application, or the call is disconnected. The root document information is available to all documents in the same application. VoiceXML documents define applications as a set of named dialog states. The user is always in one dialog state at any time. Each dialog specifies the next dialog to transition to using a URL. An application may thus potentially consist of several chained scripts fetched from the SRF Controller by the gateway before the TCAP result is returned to the SCF 17.

When INAP information and instructions are received by SRF Controller 36, it is thus able to dynamically generate the VoiceXML application—step 58—and serve it to gateway 30. Once the, or each, VoiceXML document is provided to gateway 30, it is interpreted and the resulting dialog is conducted using the appropriate bearer channel set up to the SCF 70 from SSF 14.

It will be further understood that the VoiceXML dialog may include forms. A form defines an interaction that collects values for each of the fields in the form. Each field may specify a prompt, the expected input, and evaluation rules. The collected data can be submitted to the SRF Controller and stored there for later transmission to SCF 17 or directly forwarded to the SCF 17 as it is received.

[8] Upon the completion of the dialog SRF Controller 36 signals this to SCF 17. The results collected from forms during the course of the dialog are then packaged as a "SpecializedResourceReport" INAP response to SCF 17 and the transaction between SCF 17 and the SRF controller completes. SCF 17 may then terminate the dialog. The corresponding SLP then resumes control.

Of course, it is possible that no reply is forthcoming to the http request from media gateway 30 to SRF Controller 36 and the media gateway 30 may be prepared to deal with this by setting a time-out period. If no reply is received within this period, media gateway 30 could either play a predetermined "item unavailable" announcement, or it could report the problem to the controlling SLP executing on SCF 17, it then being the responsibility of the SLP to decide what action to take next.

The VoiceXML gateway would normally detect events like "cancel", "hang-up", "no match", "user call transfer" or the like and VoiceXML pages can contain event management logic that specifies the actions to be taken upon occurrence of these events.

Many variants are, of course, possible to the above-described arrangements and a number of these variants are described below.

It will be appreciated that the role of SCF 17 in the described embodiments could be carried out by any suitable service controlling entity including an Adjunct or service node SN; in this latter case, the media gateway 30 is preferably functionality provided in the SN. Of course, the above-described techniques can also be applied to telephone systems other than just PSTNs, for example to PLMNs and other mobile networks, and to private systems.

In the method, described above SRF Controller 36 issues an assist request to SCF 17 in order to obtain the information it needs to prepare the VoiceXML application. Of course, it would also be possible for SCF 17 to proactively prime the SRF controller 36 with this information so that SRF Controller 36 already has it when it receives the corresponding http request from media gateway 30.

Whilst this embodiment has been described with reference to application of the JSP technology, generation or determination of the page may be carried out in any other suitable way, such as by translating the command into primary VoiceXML commands (play announcement and/or collect digits) or starting the execution of a static VoiceXML application identified directly by the content code or otherwise.

Similarly, the invention is not limited to the use of the VoiceXML mark-up language or to the conduct of a voice dialog via a bearer channel, rather the invention may be applied to any situation where a media gateway may be combined with a web server to act as an SRF including in a multi-modal environment where an SRF may deliver other media content such as video to a user via another channel, but under the control of an SLP running in an SCP.

As used herein, the term "telephone network" means a system, such as a PSTN, PLMN or private telephone network, which comprises a bearer network with switches for setting up a bearer channel through the network between end-user telephone equipment (including fax and similar items capable of dialing a telephone number). Reference to a "call" in the context of a telephone network is to be understood as meaning a communication through a bearer channel set up across the network, whilst references to call setup, maintenance and takedown are to be taken to mean the processes of setting up, maintaining and taking down a bearer channel through the bearer network. Terms such as "call processing" and "call handling" are to be similarly interpreted. The term "media gateway" is to be interpreted as a function that provides media mapping and/or transcoding functions between the telephone network and a packet, frame or cell data network and that may include other functions, such as the VoiceXML browser functionality described above. The term "document" is intended to refer to any kind of encapsulated and electronically-stored content that is intended to provide or enable the provision of material for presentation to and comprehension by a human-being, such as text, audio or video data or a program or script that participates in or controls their delivery from another source.

It will be appreciated that commercialised forms of the present embodiment would in practice take the form of a set of computer programs adapted to run on general-purpose computing platforms within general-purpose operating environments such as are provided by the Microsoft Windows, Linux or HP-UX operating systems and their related programming libraries and tools, and/or high availability (HA) implementations thereof. These programs may be marketed in the form of suitably coded computer program products including program code elements that implement the functionality described. It will be appreciated though that the techniques described may equally be implemented as special purpose hardware or any combination of software, hardware and/or firmware.

Although a specific embodiment of the invention has been described, the invention is not to be limited to the specific arrangement so described. The invention is limited only by the claims.

The invention claimed is:

1. Server apparatus having a first interface for communication with a signaling network of a telephone network and a second interface for communication with a media gateway that has at least one bearer channel to the telephone network,
the apparatus having a control arrangement comprising a specialized resource function controller for enabling the apparatus to provide, through the second interface, a document for rendering by the media gateway, the document being provided at least partly under the control of information received from a service control subsystem of the telephone network in an interaction through the first interface,
wherein the combination of the server apparatus and the media gateway provide a specialized resource function within the telephone network, and
wherein the specialized resource function controller comprises server-side modules for processing the information from the service control subsystem and program building blocks for accessing the service control subsystem.

2. Server apparatus as claimed in claim 1 wherein the document comprises control tags for interpretation by the media gateway.

3. Server apparatus as claimed in claim 2 wherein the control tags are VoiceXML tags.

4. Server apparatus as claimed in claim 1 wherein the control arrangement is arranged to initiate the interaction with the service control subsystem, the service control subsystem being identified by an identifier received by the server apparatus from the media gateway.

5. Server apparatus as claimed in claim 4 wherein the control arrangement is arranged to provide to the service control subsystem a context identifier received from the media gateway to identify a session context held by the service control subsystem.

6. Server apparatus as claimed in claim 1 wherein the second interface is an http interface, the document being provided to the media gateway in response to an http request therefrom.

7. Server apparatus as claimed in claim 1 wherein the interaction with the service control subsystem uses an IN or IN-like model such as INAP, IS41 or CAMEL.

8. A media gateway comprising a bearer interface to a telephone network; an interface to a data network, and an interpreter for rendering documents received from the data network, the gateway having a control arrangement for responding to an incoming call by extracting at least a service control subsystem identifier from call setup information received for the incoming call and issuing a request to the data network to obtain a document for rendering, passing at least the extracted service control subsystem identifier as a parameter in the request.

9. A media gateway as claimed in claim 8 wherein the control arrangement is arranged to extract a context identifier from the call setup information, and to pass the extracted context identifier as a parameter in the request.

10. A media gateway as claimed in claim 8 wherein the request is an http request.

11. A subsystem for providing a specialized resource function within a telephone network having a signaling network and at least one service control subsystem, the subsystem comprising:
at least one media gateway comprising a bearer interface to a telephone network; and
server apparatus comprising a first interface for communication with the signaling network and a second interface for communication with the media gateway;
wherein
the server apparatus comprises a control arrangement comprising a specialized resource function controller for enabling the apparatus to provide, through the second interface, a document for rendering by the media gateway, the document being provided at least partly under the control of information received from the service control subsystem in an interaction through the first interface;
the specialized resource function controller comprises server-side modules for processing the information from the service control subsystem and program building blocks for accessing the service control subsystem; and
the media gateway comprises an interpreter for rendering documents received from the server apparatus, the media gateway having a control arrangement for responding to an incoming call by extracting at least a service control subsystem identifier from call setup information received for the incoming call and issuing a request to obtain a document from the server apparatus for rendering, passing at least the extracted service control subsystem identifier as a parameter in the request.

12. A subsystem as claimed in claim 11 wherein the control arrangement of the media gateway is arranged to extract a context identifier from the call setup information, and to pass the extracted context identifier as a parameter in the request, the server apparatus passing the context identifier to the service control subsystem as part of the interaction.

13. A subsystem as claimed in claim 11 comprising a plurality of media gateways.

14. A subsystem as claimed in claim 11 wherein the server apparatus and the media gateway communicate using http and the request is an http request.

15. A subsystem as claimed in claim 11 wherein the documents contain control tags for interpretation by the interpreter.

16. A subsystem as claimed in claim 15 where in the control tags are VoiceXML tags and the interpreter is a VoiceXML browser.

17. A method for operating server apparatus comprising:
receiving a request from a media gateway;
specifying documents to be provided in response to the request using at least some information received from a service control subsystem in an interaction through an interface to a signaling network of a telephone network; and
providing the specified documents by a specialized resource function controller for rendering by a media gateway in response to the request,
wherein the specialized resource function controller comprises server-side modules for processing the information from the service control subsystem and program building blocks for accessing the service control subsystem.

18. A method as claimed in claim 17 comprising initiating the interaction with the service control subsystem in response to receiving the request.

19. A method as claimed in claim 17 comprising receiving a service control subsystem identifier from the media gateway as part of the request.

20. A method as claimed in claim 17 comprising receiving a context identifier from the media gateway as part of the request and passing the context identifier to the service control subsystem in the interaction.

21. A method as claimed in claim 17 wherein the request is an http request and the documents contain VoiceXML control tags.

22. A computer program product for use with a server platform that is provided with a first interface for communication with a signaling network of a telephone network and a second interface for communication with a media gateway that has at least one bearer channel to the telephone network, the computer program product comprising program code elements to provide a control arrangement comprising a specialized resource function controller for providing, through the second interface, a document for rendering by the media gateway, the document being provided by a specialized resource function controller and at least partly under the control of information received from a service control subsystem of the telephone network in an interaction through the first interface,
wherein the combination of the server apparatus and the media gateway provide a specialized resource function within the telephone network, and
wherein the specialized resource function controller comprises server-side modules for processing the information from the service control subsystem and program building blocks for accessing the service control subsystem.

23. A computer program product as claimed in claim 22 arranged to initiate the interaction with the service control subsystem, the service control subsystem being identified by an identifier received by the server apparatus from the media gateway.

24. A computer program product as claimed in claim 22 arranged to provide to the service control subsystem a context identifier received from the media gateway to identify a session context held by the service control subsystem.

25. A computer program product as claimed in claim 22 wherein the second interface is an http interface, the document being provided to the media gateway in response to an http request therefrom.

26. A computer program product as claimed in claim 22 wherein the interaction with the service control subsystem uses an IN or IN-like model, such as INAP, IS41 or CAMEL.

* * * * *